US012671476B2

(12) United States Patent
Silverman et al.

(10) Patent No.: US 12,671,476 B2
(45) Date of Patent: Jun. 30, 2026

(54) PREDICTING CONNECTION ISSUES IN A WIRELESS BAND

(71) Applicant: Cisco Technology, Inc., San Jose, CA (US)

(72) Inventors: Matthew Aaron Silverman, Shaker Heights, OH (US); Ardalan Alizadeh, Milpitas, CA (US); John Matthew Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 616 days.

(21) Appl. No.: 18/171,774

(22) Filed: Feb. 21, 2023

(65) Prior Publication Data

US 2024/0283506 A1 Aug. 22, 2024

(51) Int. Cl.
*H04B 7/06* (2006.01)

(52) U.S. Cl.
CPC ......... *H04B 7/0626* (2013.01); *H04B 7/0617* (2013.01)

(58) Field of Classification Search
CPC ........................... H04B 7/0626; H04B 7/0617
See application file for complete search history.

(56) References Cited

U.S. PATENT DOCUMENTS 8,295,263 B1 * 10/2012 Chen ........................ H04L 1/16
                                                 370/345
2015/0189686 A1    7/2015 Kasher

| | | | |
|---|---|---|---|
| 2016/0080051 A1 * | 3/2016 | Sajadieh | .............. H04B 7/0452 |
| | | | 375/267 |
| 2016/0127937 A1 * | 5/2016 | Schelstraete | .......... H04W 88/08 |
| | | | 370/252 |
| 2019/0059056 A1 | 2/2019 | Islam et al. | |
| 2019/0288760 A1 * | 9/2019 | Li | ........................ H04B 7/0632 |
| 2019/0297664 A1 | 9/2019 | Kyles et al. | |
| 2020/0100125 A1 * | 3/2020 | Sun | ........................ H04W 24/08 |
| 2022/0014246 A1 * | 1/2022 | Zhu | ........................ H04B 7/0617 |
| 2022/0141770 A1 | 5/2022 | Ahn et al. | |
| 2023/0036683 A1 * | 2/2023 | Karri | .................... H04B 7/0626 |
| 2023/0344480 A1 * | 10/2023 | Liu | .................... H04B 7/06954 |
| 2024/0413877 A1 * | 12/2024 | Qi | ........................ H04B 7/0617 |

FOREIGN PATENT DOCUMENTS

WO 2022052708 A1 3/2022

* cited by examiner

*Primary Examiner* — Nicholas A Jensen
*Assistant Examiner* — Ayodele Lawrence Olubodun
(74) *Attorney, Agent, or Firm* — Merchant & Gould P.C.

(57) ABSTRACT

Connection issue prediction may be provided. A computing device may receive first Channel State Information (CSI) for a first link associated with a client device. The first CSI may be collected when beamforming was trained on a second link associated with the client device. Second CSI may be received for the first link associated with the client device. The second CSI may be collected at a time subsequent to when beamforming was trained on the second link associated with the client device. A correlation between the first CSI and the second CSI may be determined to be below a predetermined threshold. A status of the beamforming performed on the second link associated with the client device may be set to stale in response to determining that the correlation between the first CSI and the second CSI is below the predetermined threshold.

20 Claims, 3 Drawing Sheets

┌─ 200

( Start ) ┌─ 205

┌─ 210
Receive first channel state information (CSI) for a first link associated with a client device wherein the first CSI was collected when beamforming was trained on a second link associated with the client device ┌─ 220
Receive second CSI for the first link associated with the client device wherein the second CSI was collected at a time subsequent to when beamforming was trained on the second link associated with the client device ┌─ 230
Determine that a correlation between the first CSI and the second CSI is below a predetermined threshold ┌─ 240
Set a status of the beamforming performed on the second link associated with the client device to stale in response to determining that the correlation between the first CSI and the second CSI is below the predetermined threshold ┌─ 250
( End )

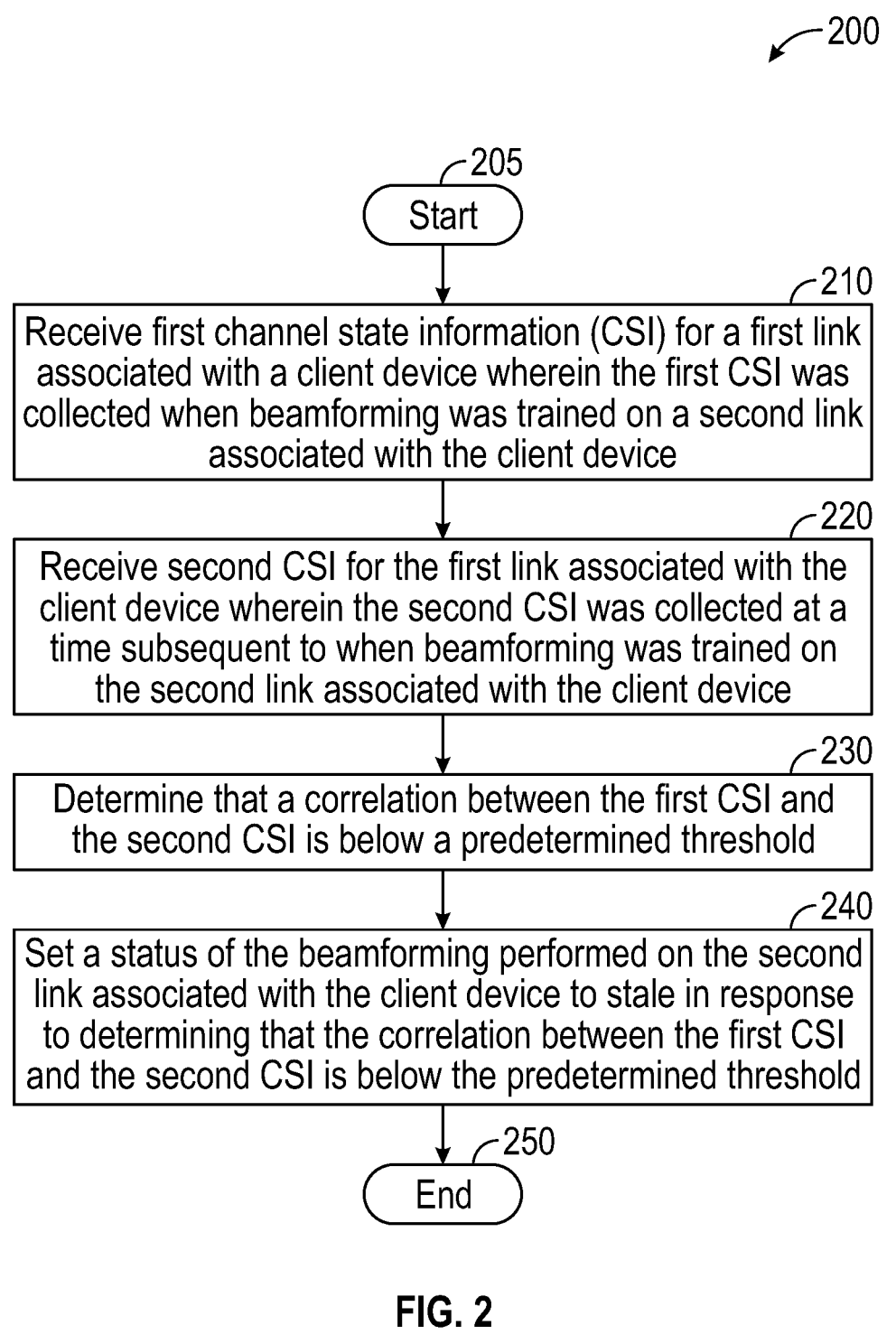

200

205

Start

210

Receive first channel state information (CSI) for a first link associated with a client device wherein the first CSI was collected when beamforming was trained on a second link associated with the client device

220

Receive second CSI for the first link associated with the client device wherein the second CSI was collected at a time subsequent to when beamforming was trained on the second link associated with the client device

230

Determine that a correlation between the first CSI and the second CSI is below a predetermined threshold

240

Set a status of the beamforming performed on the second link associated with the client device to stale in response to determining that the correlation between the first CSI and the second CSI is below the predetermined threshold

250

End

FIG. 2

PREDICTING CONNECTION ISSUES IN A WIRELESS BAND

TECHNICAL FIELD

The present disclosure relates generally to predicting connection issues in a wireless band.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing connection issue prediction.

DETAILED DESCRIPTION

Overview

Figure 1:
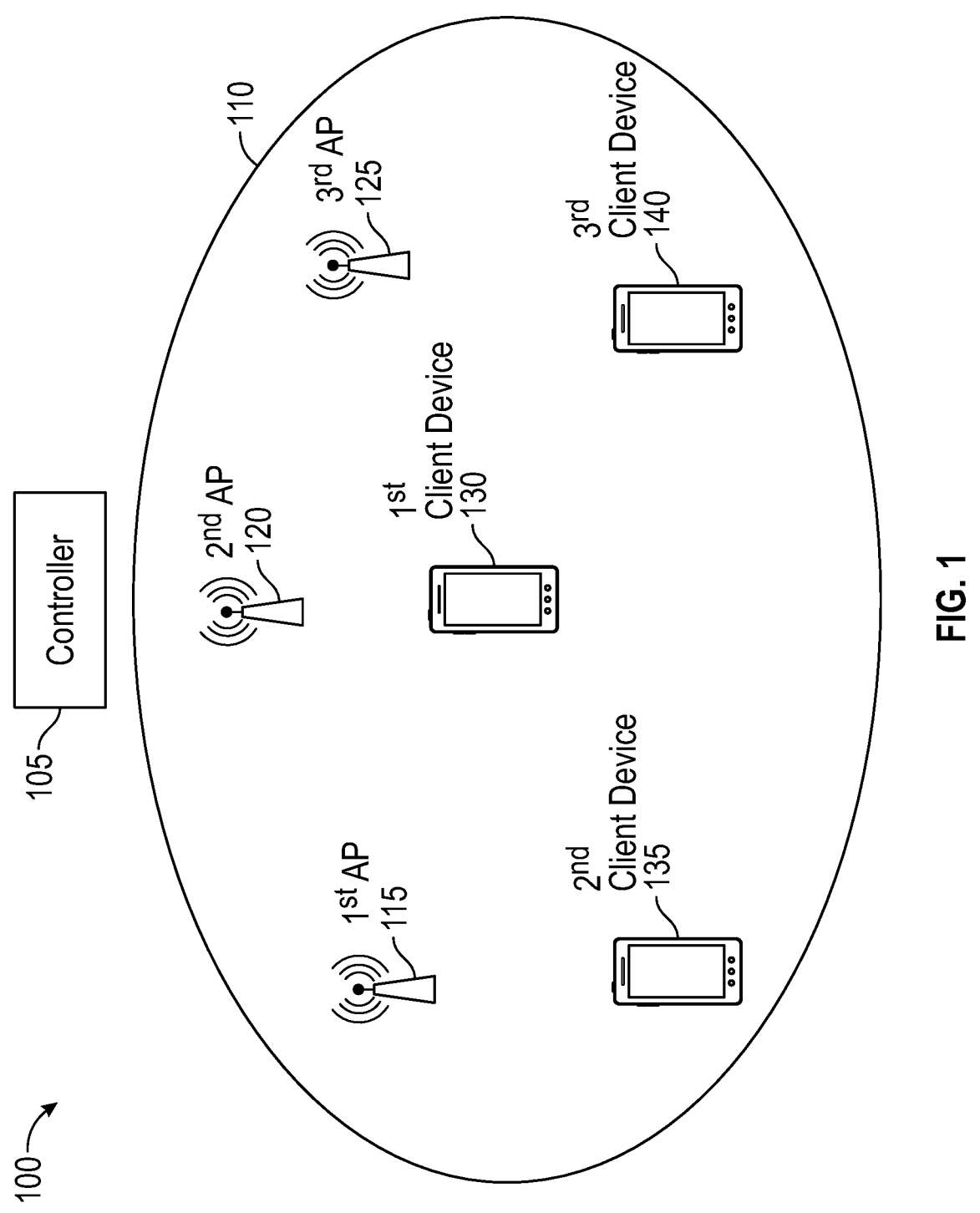
FIG. 1 is a block diagram of an operating environment for providing connection issue prediction.

Connection issue prediction may be provided. A computing device may receive first Channel State Information (CSI) for a first link associated with a client device. The first CSI may be collected when beamforming was trained on a second link associated with the client device. Second CSI may be received for the first link associated with the client device. The second CSI may be collected at a time subsequent to when beamforming was trained on the second link associated with the client device. A correlation between the first CSI and the second CSI may be determined to be below a predetermined threshold. A status of the beamforming performed on the second link associated with the client device may be set to stale in response to determining that the correlation between the first CSI and the second CSI is below the predetermined threshold.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multi-link Operation (MLO) may enable devices to simultaneously transmit and receive across different bands and channels by establishing two or more links to two or more AP radios. These bands may comprise, but are not limited the 2 GHz band, the 5 GHz band, the 6 GHz band, and mm wavelength bands (e.g., the 60 GHz band).

Beamforming may be used in the mm wavelength bands. Beamforming may comprise a signal processing technique used in sensor arrays for directional signal transmission or reception. This may be achieved by combining elements in an antenna array in such a way that signals at particular angles experience constructive interference while others experience destructive interference. Beamforming may be used at both the transmitting and receiving ends in order to achieve spatial selectivity. The improvement compared with omnidirectional reception and transmission is known as the directivity of the array.

The mm wavelength bands (e.g., 60 GHz Wi-Fi operation) may rely on analog beamforming. Analog beamforming may be different than digital beamforming in that it may be done by a series of analog phase shifters instead of digital matrix operations. This may make finding the best beamforming state more difficult because it may not be directly computed from multi-dimensional Channel State Information (CSI).

Analog beamforming may engage in an expensive training sequence if the beamforming is state, which may happen any time the device moves or the environment changes. Accordingly, embodiments of the disclosure may monitor changes in CSI on other links in other bands (e.g., 2 GHz band, the 5 GHz band, the 6 GHz band) and trigger beamforming training in a mm wavelength link (e.g., the 60 GHz band) in response to those CSI changes.

In a multilink environment with a 60 GHz link and one or more sub-7 GHz links (e.g., 2 GHz band, the 5 GHz band, the 6 GHz band), the 60 GHz link may be idle or asleep for power saving reasons for a period of the time. If a MLO link AP wants to send data over the 60 GHz link, it may need to determine if the 60 GHz link is still viable before attempting otherwise, it may take an extended period of time (e.g., between 100 ms and 3 s) to retrain the link's beamforming. In order to estimate if the 60 GHz link needs to be retrained for a given AP and client device pair, the CSI on the sub-7 GHz link may be monitored and prematurely wake the 60 GHz link and retrain beamforming prior to data transmission.

FIG. 1 shows an operating environment 100 providing connection issue prediction. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use MLO where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide connection issue prediction.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

FIG. 2 is a flow chart setting forth the general stages involved in a method 200 consistent with embodiments of the disclosure providing connection issue prediction. Method 200 may be implemented using first AP 115 as described in more detail above with respect to FIG. 1. Ways to implement the stages of method 200 will be described in greater detail below.

Method 200 may begin at starting block 205 and proceed to stage 210 where first AP 115 may receive first Channel State Information (CSI) for a first link associated with a client device wherein the first CSI was collected when beamforming was trained on a second link associated with the client device. For example, first AP 115 may comprise a MLO device having at least one sub-7 GHz link (e.g., the first link) and a 60 GHz link (e.g., the second link). The first link and the second link may be with a specific client device (e.g., first client device 130). When beamforming is trained on the 60 GHz link with the client device, the sub-7 GHz link may be sounded via explicit or implicit sounding with the client device. The first CSI may comprise the CSI collected from this sounding of the sub-7 GHz link. The 60 GHz radio may notify first AP 115 that it is performing beamforming training for a particular client device (e.g., first client device 130).

First AP 115 may trigger explicit sounding to the available sub-7 GHz links. The data from the sounding may be decompressed and stored in memory (or just the strongest singular vector may be stored). Simultaneously, the implicit sounding from a feedback Physical Layer Protocol Data Unit (PPDU) itself may be used to calibrate between explicit and implicit sounding. Alternatively, the implicit CSI may be obtained and Single Value Decomposition (SVD) may be performed on it to obtain a dominant singular vector that may be stored.

From stage 210, where first AP 115 receives the first CSI for the first link associated with a client device wherein the first CSI was collected when beamforming was trained on the second link associated with the client device, method 200 may advance to stage 220 where first AP 115 may receive second CSI for the first link associated with the client device wherein the second CSI was collected at the time subsequent to when beamforming was trained on the second link associated with the client device. For example, at a later point in time from when beamforming was trained on the second link with the client device, the second CSI is collected on the first link with the client device.

Once first AP 115 receives the second CSI for the first link associated with the client device wherein the second CSI was collected at the time subsequent to when beamforming was trained on the second link associated with the client device in stage 220, method 200 may continue to stage 230 where first AP 115 may determine that a correlation between the first CSI and the second CSI (e.g., cross correlation) is below a predetermined threshold. For example, any time CSI is received from an uplink packet from the client device (e.g., first client device 130) or from sounding the channel to the client device, the dominant singular vector of the most recent sounding may be compared to the one that represents the sounding at the time of the 60 GHz link beamforming training.

If the correlation between the current vector and the vector during the last training is below a predetermined threshold, the link may be considered stale. This may indicate that first client device 130 has moved or the environment has changed enough to where the current beamforming is no longer valid and needs retraining. If the correlation between the current vector and the vector during last training is above a predetermined threshold, the link may be considered fresh. This may indicate that first client device has not moved or the environment has not changed enough to where the current beamforming is still valid and may not need retraining. First AP 115 may be notified that the 60 GHz link is stale or fresh.

After first AP 115 determines that the correlation between the first CSI and the second CSI is below a predetermined threshold in stage 230, method 200 may proceed to stage 240 where first AP 115 may set a status of the beamforming performed on the second link associated with the client device to stale in response to determining that the correlation between the first CSI and the second CSI is below the predetermined threshold. For example, when first AP 115 is considering sending data across the 60 GHz link, it may first check the beamforming status for staleness. If it is stale, it may postpone loading the link with data to first client device 130. It may instead initiate 60 GHz link beamforming retraining. Once the retraining is complete, sounding may again be triggered on the sub-7 GHz channel, that sounding data may be stored as a new representation of the channel at retraining time, and the data may be safely sent over the 60 G Hz link. If the check of the beamforming status indicated fresh, the data may be safely sent over the 60 G Hz link without having to perform the beamforming retraining. Once first AP 115 sets the status of the beamforming performed on the second link associated with the client device to stale in response to determining that the correlation between the first CSI and the second CSI is below the predetermined threshold in stage 240, method 200 may then end at stage 250.

Figure 3:
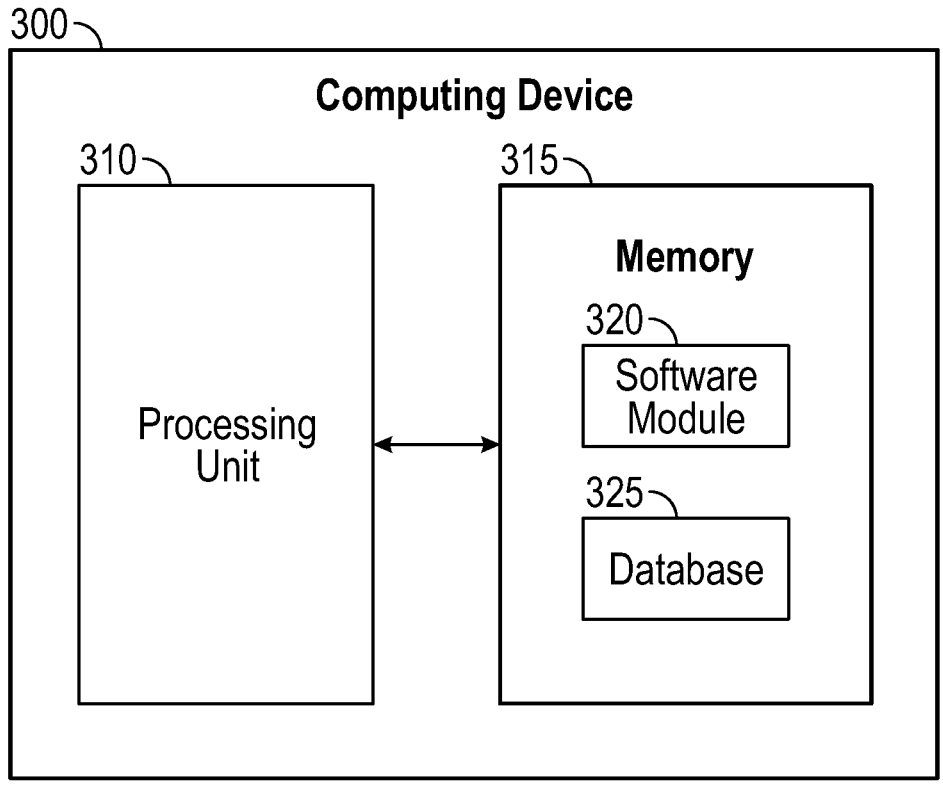
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing connection issue prediction as described above with respect to FIG. 2. Computing device 300, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving, by a computing device, first Channel State Information (CSI) for a first link associated with a client device, wherein the first CSI was collected when beamforming was trained on a second link associated with the client device;

receiving second CSI for the first link associated with the client device, wherein the second CSI was collected at a time subsequent to when beamforming was trained on the second link associated with the client device;

determining that a correlation between the first CSI and the second CSI is below a predetermined threshold; and setting a status of the beamforming performed on the second link associated with the client device to stale in response to determining that the correlation between the first CSI and the second CSI is below the predetermined threshold.

2. The method of claim 1, further comprising receiving data to be sent on the second link to the client device.

3. The method of claim 2, further comprising retraining beamforming on the second link associated with the client device in response to the status of the beamforming trained on the second link associated with the client device was set to stale.

4. The method of claim 3, further comprising receiving third CSI for the first link associated with the client device wherein the third CSI was collected when beamforming was retrained on the second link associated with the client device.

5. The method of claim 1, wherein the first link is associated with one of 2 GHz band, 5 GHz band, and 6 GHz band.

6. The method of claim 1, wherein the second link is associated with 60 GHz band.

7. The method of claim 1, wherein the first CSI and the second CSI were obtained via implicit sounding.

8. The method of claim 1, wherein the first CSI and the second CSI were obtained via explicit sounding.

9. A system comprising:

a memory storage; and a processing unit coupled to the memory storage, wherein the processing unit is operative to:

receive first Channel State Information (CSI) for a first link associated with a client device, wherein the first CSI was collected when beamforming was trained on a second link associated with the client device;

receive second CSI for the first link associated with the client device, wherein the second CSI was collected at a time subsequent to when beamforming was trained on the second link associated with the client device;

determine that a correlation between the first CSI and the second CSI is below a predetermined threshold; and set a status of the beamforming performed on the second link associated with the client device to stale in response to determining that the correlation between the first CSI and the second CSI is below the predetermined threshold.

10. The system of claim 9, further comprising the processing unit being operative to receive data to be sent on the second link to the client device.

11. The system of claim 10, further comprising the processing unit being operative to retrain beamforming on the second link associated with the client device in response to the status of the beamforming trained on the second link associated with the client device was set to stale.

12. The system of claim 11, further comprising the processing unit being operative to receive third CSI for the first link associated with the client device wherein the third CSI was collected when beamforming was retrained on the second link associated with the client device.

13. The system of claim 9, wherein the first link is associated with one of 2 GHz band, 5 GHz band, and 6 GHz band.

14. The system of claim 9, wherein the second link is associated with 60 GHz band.

15. The system of claim 9, wherein the first CSI and the second CSI were obtained via implicit sounding.

16. The system of claim 9, wherein the first CSI and the second CSI were obtained via explicit sounding.

17. A non-transitory computer-readable medium that stores a set of instructions which when executed perform a method executed by the set of instructions comprising:

receiving, by a computing device, first Channel State Information (CSI) for a first link associated with a client device, wherein the first CSI was collected when beamforming was trained on a second link associated with the client device;

receiving second CSI for the first link associated with the client device, wherein the second CSI was collected at a time subsequent to when beamforming was trained on the second link associated with the client device;

determining that a correlation between the first CSI and the second CSI is above a predetermined threshold; and setting a status of the beamforming performed on the second link associated with the client device to fresh in response to determining that the correlation between the first CSI and the second CSI is below the predetermined threshold.

18. The non-transitory computer-readable medium of claim 17, further comprising receiving data to be sent on the second link to the client device.

19. The non-transitory computer-readable medium of claim 18, determining that the status of the beamforming trained on the second link associated with the client device was set to fresh in response to receiving the data to be sent on the second link to the client device.

20. The non-transitory computer-readable medium of claim 19, further comprising sending the data on the second link in response to determining that the status of the beamforming trained on the second link associated with the client device was set to fresh.

* * * * *